United States Patent
Ju et al.

(10) Patent No.: US 10,122,672 B2
(45) Date of Patent: Nov. 6, 2018

(54) ACCOUNTING FOR USER INTERACTION WITH A SOCIAL NETWORKING SYSTEM WHEN NOTIFYING THE USER OF CONTENT PROVIDED TO A GROUP MAINTAINED BY THE SOCIAL NETWORKING SYSTEM INCLUDING THAT USER

(71) Applicant: Facebook, Inc., Menlo Park, CA (US)

(72) Inventors: Li Ju, Issaquah, WA (US); Pawel Bara, Seattle, WA (US); Adit Vaidya, San Francisco, CA (US); Felix Wong, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 359 days.

(21) Appl. No.: 14/980,415

(22) Filed: Dec. 28, 2015

(65) Prior Publication Data

US 2017/0187665 A1    Jun. 29, 2017

(51) Int. Cl.
*H04L 12/58* (2006.01)
*H04L 29/08* (2006.01)

(52) U.S. Cl.
CPC .............. *H04L 51/32* (2013.01); *H04L 51/10* (2013.01); *H04L 51/34* (2013.01); *H04L 67/22* (2013.01)

(58) Field of Classification Search
CPC ......... H04L 51/32; H04L 51/34; H04L 67/22; H04L 51/10
See application file for complete search history.

(56) References Cited

U.S. PATENT DOCUMENTS

| | | | | |
|---|---|---|---|---|
| 8,190,711 | B1 * | 5/2012 | Borodich | G06F 17/30876 705/20 |
| 2011/0296004 | A1 * | 12/2011 | Swahar | G06F 17/3053 709/224 |
| 2013/0007133 | A1 * | 1/2013 | Zuckerberg | G06Q 30/02 709/204 |
| 2013/0031034 | A1 * | 1/2013 | Gubin | G06Q 10/06393 706/12 |
| 2013/0246521 | A1 * | 9/2013 | Schacht | G06Q 50/01 709/204 |
| 2014/0040370 | A1 * | 2/2014 | Buhr | H04L 67/306 709/204 |

(Continued)

FOREIGN PATENT DOCUMENTS

WO    WO-2014085306 A1 *    6/2014    ............. G06Q 50/01

*Primary Examiner* — Michael A Keller
*Assistant Examiner* — Javier O Guzman
(74) *Attorney, Agent, or Firm* — Fenwick & West LLP

(57) ABSTRACT

A social networking system maintains various groups that each include one or more users and maintains information describing interactions by users with the social networking system. Based on interactions with the social networking system by the user, the social networking system determines a time interval when the user most frequently interacts with the social networking system. Additionally, the social networking system selects various content items provided to groups including the user based on amounts of interaction with content items provided to groups including the user by other social networking system users. During the time interval when the user most frequently interacts with the social networking system, information identifying a set of the selected content items is presented to the user via the social networking system.

19 Claims, 2 Drawing Sheets

(56) References Cited

U.S. PATENT DOCUMENTS

2015/0095281 A1* 4/2015 Nieminen ......... G06F 17/30377
707/618
2016/0034424 A1* 2/2016 Won ..................... G06F 17/211
715/273

* cited by examiner

ACCOUNTING FOR USER INTERACTION WITH A SOCIAL NETWORKING SYSTEM WHEN NOTIFYING THE USER OF CONTENT PROVIDED TO A GROUP MAINTAINED BY THE SOCIAL NETWORKING SYSTEM INCLUDING THAT USER

BACKGROUND

This disclosure relates generally to social networking systems, and more specifically to communication of content between users in a group maintained by a social networking system.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, a social networking system may maintain groups of users, allowing a user to provide content to a group for presentation to each user included in the group. A group may be associated with a topic, with a location, or with any other suitable characteristic, so a user included in the group may more easily view or share content associated with the characteristic associated with the group. For example, users in a group provide content items to a group to simplify presentation of the content items to other users in the group. However, a user may be included in a large number of groups, which may receive significant numbers of content items from users in the groups. With a large number of content items provided to various groups including a user, the user may have difficulty identifying content items from the groups interesting or relevant to the user. This may decrease the likelihood of the user joining groups or providing content to groups, which may decrease the amount of interaction between the user and other users of the social networking system.

SUMMARY

Users of a social networking system communicate various content items, such as messages, images, or video data, to each other via the social networking system. To simplify communication of content items among users, the social networking system maintains various groups each including one or more users of the social networking system. A user may provide content items to a group, and the social networking system presents the content to the users included in the group. A user may provide content items to a group including the user for distribution to other users in the group or may view or otherwise access content items associated with the group including the user.

The social networking system also maintains information describing interactions by various users with the social networking system along with times when the interactions were performed by the users. For example, the social networking system associates information with an identifier of the user that describes interactions with the social networking system by the user and times when the user performed the various interactions with the social networking system. Example interactions with the social networking system stored in association with the user include: accessing the social networking system via an application executing on a client device, viewing content presented by the social networking system via a client device, providing content to the social networking system, indicating a preference for a content item presented by the social networking system, communicating messages to other users via the social networking system, sharing a content item with another user of the social networking system, and commenting on a content item presented by the social networking system.

Based on maintained information describing interactions by the user with the social networking system, the social networking system determines a time interval when the user most frequently interacts with the social networking system. For example, the social networking system determines numbers of interactions by the user with the social networking system associated with times of day over a specific duration (e.g., within a week of a current time, within a month of the current time) and selects a time of day associated with a maximum number of interactions by the user. In some embodiments, the social networking system determines the time interval when the user most frequently interacts with the social networking system as a specified duration from the time of day associated with the maximum number of interactions or as the specified duration before the time of day associated with the maximum number of interactions by the user. In other embodiments, the social networking system determines numbers of interactions by the user with the social networking system associated with different time intervals (e.g., different hours of a day) during the specific duration and selects a time interval associated with a maximum number of interactions by the user as the time interval when the user most frequently interacts with the social networking system.

To allow a user to more easily identify content items from groups including the user, the social networking system identifies content items provided to groups including the user by other social networking system users that the user has not viewed and determines amounts of interaction with each of the identified content items by social networking system users. In various embodiments, the social networking system determines an amount of interaction with an identified content item based on a number of specific types of interactions with the identified content item. For example, the social networking system determines an amount of interaction with an identified content item based on a number of times users have indicated a preference for the identified content item, users have shared the identified content item with other users, and users have commented on the identified content item. In various embodiments, the social networking system determines scores for each of the identified content items based on the numbers of specific interactions with the identified content items. For example, a score for an identified content item is a sum of a number of interactions with the identified content item where users indicated a preference for the identified content item, a number of interactions with the identified content item where users shared the identified content item with another user, and a number of interactions with the identified content item where users commented on the identified content item. In some embodiments, the social networking system associates different weights with different interactions and applies a weight associated with an interaction to a number of each interaction with the identified content item. For example, a larger weight is associated with commenting on the identified content item than is associated with indicating a preference for the identified content item. The social networking system then determines the score for the identified content item by combining the numbers of the specific interactions after application of the weights. Additionally, the social networking system may account for an amount of time since the identified content item was received by the social networking system. For example, the social networking system applies a decay factor to a combination of numbers of specific interactions with the identified content item that decreases as the time since the social networking system received the identified content item increases. In various embodiments, the decay factor is inversely related (e.g., inversely proportional) to the amount of time since the social networking system received the candidate content item. Additionally, the social networking system may account for types of content in an identified content item when determining the score for the identified content item. For example, the social networking system increases scores for identified content items including video data or image data relative to identified content items including text data and not including video data or image data.

To identify content items provided to one or more groups including the user with which the user is likely to interact, the social networking system selects a set of identified content items having at least a threshold amount of interaction by users. In various embodiments, the social networking system ranks the identified content items based on their scores and selects the set as identified content items having at least a threshold position in the ranking. Alternatively, the social networking system selects the set as identified content items having at least a threshold score.

The social networking system presents information identifying the set of the identified content items to the user at a time within the determined time interval when the user most frequently interacts with the social networking system. Presenting information identifying the set of identified content items at the time within the time interval when the user most frequently interacts with the social networking system increases the likelihood of the user viewing the information describing the set of identified content items and subsequently interacting with one or more of the identified content items in the set. For example, the social networking system communicates a notification describing the set of the identified content items to one or more client devices associated with the user at the time within the determined time interval. In various embodiments, the notification identifies a number of content items in the set and is presented in a specific portion of an application executing on a client device that presents content from the social networking system to the user.

In some embodiments, the social networking system modifies a frequency with which the user receives information identifying content items provided to groups including the user based on the user's interaction with previously presented information identifying content items provided to groups including the user. For example, the social networking system increases the frequency with which notifications identifying content items provided to groups including the user are provided to the user if the user accesses or selects notifications identifying content items provided to groups including the user at greater than a threshold frequency. Similarly, the social networking system decreases the frequency with which notifications identifying content items provided to groups including the user are provided to the user if the user accesses or selects notifications identifying content items provided to groups including the user at less than an additional threshold frequency. This allows the social networking system to regulate presentation of information identifying content provided to groups including the user based on prior interactions by the user interacting with information identifying content items provided to groups including the user. Accounting for prior interactions with information identifying content provided to groups including the user allows the social networking system to provide information about content provided to groups including the user at a frequency that increases the likelihood of the user interacting with the information.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
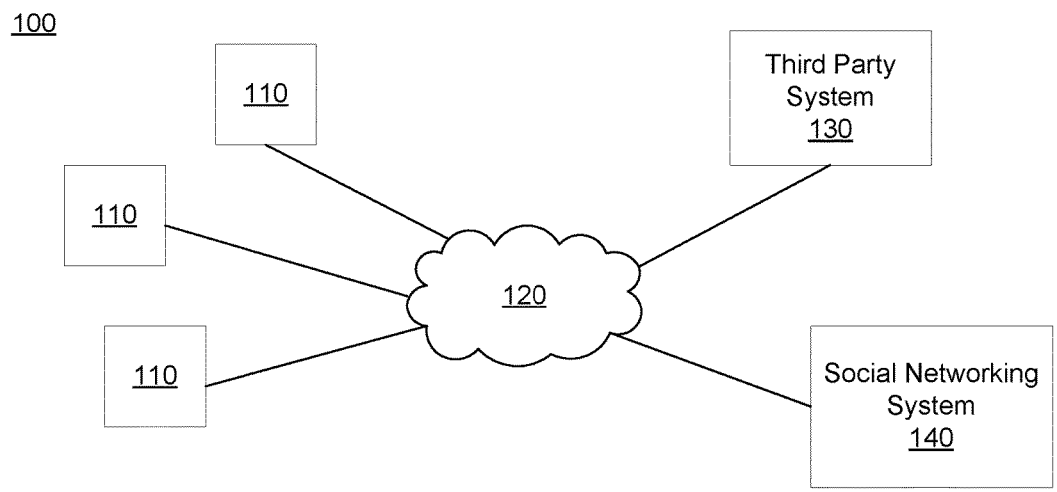
FIG. 1 is a block diagram of a system environment in which a social networking system operates, in accordance with an embodiment.

FIG. 1 is a block diagram of a system environment 100 for a social networking system 140, such as a social networking system. The system environment 100 shown by FIG. 1 comprises one or more client devices 110, a network 120, one or more third-party systems 130, and the social networking system 140. In alternative configurations, different and/or additional components may be included in the system environment 100. The embodiments described herein may be adapted to online systems that are not social networking systems The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
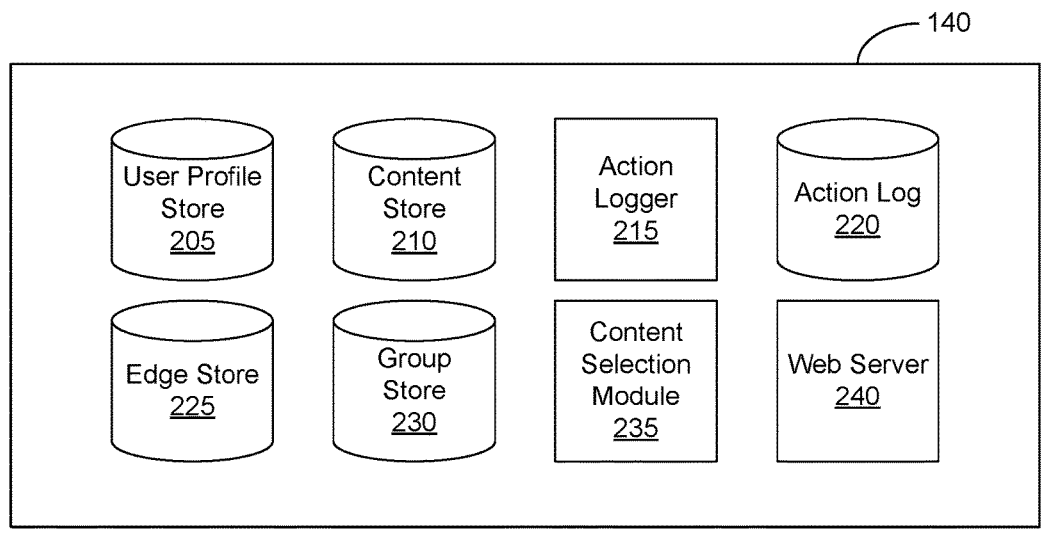
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a content selection module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by providing the content to the group rather than communicating the content to various individual users. A group may be generated by a user of the social networking system 140 identifying users associated with the group 140 or the social networking system 140 may generate one or more groups based on characteristics associated with users of the social networking system 140. Additionally, a user's interactions with a group are identified in the action log 220 or in the group store 230 by associating a group identifier with information describing an interaction with the group.

The content selection module 235 selects one or more content items for communication to a client device 110 to be presented to a user. Content items eligible for presentation to the user are retrieved from the content store 210 or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the social networking system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include advertisements from ad requests or other content items associated with bid amounts. The content selection module 235 uses the bid amounts associated with advertisement requests ("ad requests") when selecting content for presentation to the user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting advertisement content from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

Additionally, the content selection module 235 may identify content items for presentation to a user from content items provided to groups including the user based on information in the content store 210 and in the group store 230. As further described below in conjunction with FIG. 3, the content selection module 235 identifies content items provided by users to one or more groups including the user and selects a set of the identified content items based on amounts of interaction with the content items by users of the social networking system 140. In various embodiments, the content selection module 235 determines a score for each identified content item based on number of different interactions with different identified content items during a duration of time. For example, a score for an identified content item is a combination of a number of indications of preference for the identified content item, a number of times the identified content item was shared with another user, and a number of comments on the identified content item; in some embodiments, the score also accounts for an amount of time since the identified content item was received by the social networking system 140, so scores for more recently received identified content items are higher than scores for less recently received identified content items. Based on the scores for identified content items, the content selection module 235 selects a set of the identified content items.

The content selection module 235 also retrieves interactions with the social networking system 140 by the user from the action log 220 and determines a time interval when the user most frequently interacts with the social networking system 140 from the retrieved interactions. For example, the content selection module 235 determines numbers of interactions by the user with the social networking system 140 within different time intervals (e.g., different hours of a day) within a duration of time and selects a time interval including a maximum number of interactions by the user. At a time within the time interval when the user most frequently interacts with the social networking system 140, the content selection module 235 provides information identifying the set of content items to the user. For example, the content selection module 235 communicates a notification message identifying a number of identified content items in the set to a client device 110, where an application associated with the social networking system 140 presents the notification to the user. If the user accesses the notification, a portion of various identified content items in the set or a description of various content items in the set is presented to the user. Communication of information identifying the set of identified content items to a user is further described below in conjunction with FIG. 3.

For example, the content selection module 235 receives a request to present a feed of content to a user of the social networking system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user is retrieved and used to select content items, such as content items describing actions associated with one or more of the other users. Additionally, one or more advertisement requests ("ad requests") may be retrieved from the content store 210. The retrieved content items or ad requests are analyzed by the content selection module 235 to identify candidate content items, including ad requests, eligible for presentation to the user. For example, content items associated with users who not connected to the user or content items associated with users for whom the user has less than a threshold affinity are discarded as candidate content items. Based on various criteria, the content selection module 235 selects one or more of the content items or ad requests identified as candidate content for presentation to the user. The selected content items or advertisements from selected ad requests are included in a feed of content that is presented to the user. For example, the feed of content includes at least a threshold number of content items describing actions associated with users connected to the user via the social networking system 140.

In various embodiments, the content selection module 235 presents content to a user through a feed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Identifying Content Items from Groups Including a User to the User

Figure 3:
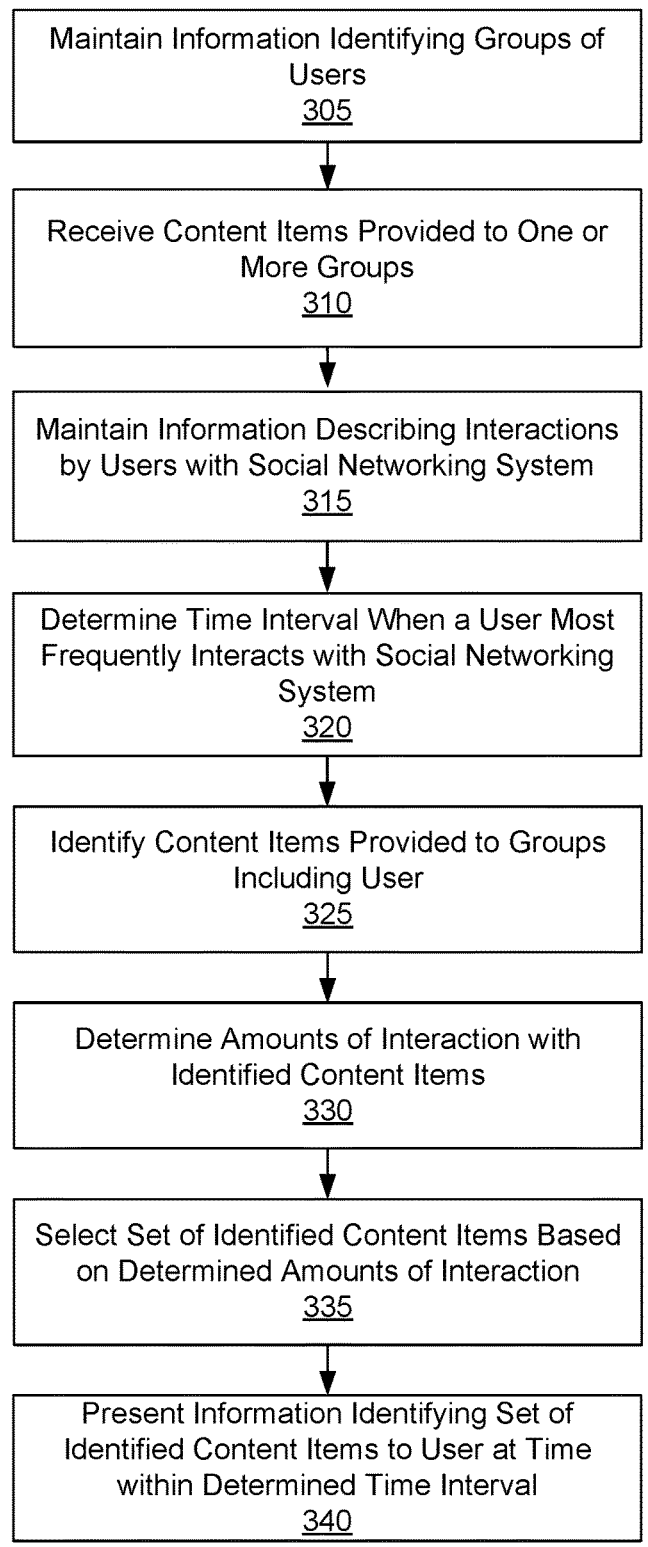
FIG. 3 is a flowchart of a method for identifying content items provided to groups maintained by a social networking system including a user to the user, in accordance with an embodiment.

FIG. 3 is a flowchart of one embodiment of a method for identifying content items provided to groups maintained by a social networking system 140 including a user to the user. In other embodiments, the method may include different and/or additional steps than those shown in FIG. 3. Additionally, steps of the method may be performed in different orders than the order described in conjunction with FIG. 3.

The social networking system 140 maintains 305 information identifying various groups of users. As described above in conjunction with FIG. 2, a group includes one or more users of the social networking system 140 and is associated with a group identifier uniquely identifying the group. One or more identifiers of users included in a group are associated with a group identifier to identify users of the social networking system 140 included in the group corresponding to the group identifier. Other information may be associated with a group identifier, such as a name identifying a group corresponding to the group identifier, a description associated with the group, descriptive information associated with the group (e.g., a location), topics associated with the group, a user that created the group, or other suitable information. A group may be generated by a user of the social networking system 140 identifying users associated with the group 140 or the social networking system 140 may generate one or more groups based on characteristics associated with users of the social networking system 140. Interactions associated with a group, such as interactions between various users and the group, are also stored by the social networking system 140 by associating the group identifier with a description of an interaction along with user identifiers of one or more users associated with the interaction.

Additionally, the social networking system 140 receives 310 content items provided to one or more of the groups from various users. When the social networking system 140 receives 310 content items provided to a group, the social networking system 140 associates identifiers of the content items with a group identifier corresponding to the group to identify the content items as associated with the group. Various users included in a group may provide content items to the group, and the social networking system 140 receives 310 the content items and associates them with the group. In some embodiments, users not included in the group may provide content items to one or more of the groups.

The social networking system 140 also maintains 315 information describing interactions by various users with the social networking system 140 along with times when the users performed the interactions. For example, the social networking system 140 associates information with an identifier of the user describing interactions with the social networking system 140 by the user and times when the user performed the various interactions with the social networking system 140. The social networking system 140 may maintain 315 information describing any suitable interaction with the social networking system 140 by users. Example interactions with the social networking system 140 stored in association with users include: accessing the social networking system 140 via an application executing on a client device 110, viewing content presented by the social networking system 140 via a client device 110, providing content items to the social networking system 140, indicating a preference for a content item presented by the social networking system 140, communicating messages to other users via the social networking system 140, sharing a content item with another user of the social networking system 140, and commenting on a content item presented by the social networking system 140.

Based on maintained information describing interactions by a user with the social networking system 140, the social networking system 140 determines 320 a time interval when the user most frequently interacts with the social networking system 140. For example, the social networking system 140 retrieves maintained information describing interactions with the social networking system 140 by the user and determines numbers of interactions by the user with the social networking system 140 associated with different times of day over a specific duration (e.g., within a week of a current time, within a month of the current time). The social networking system 140 selects a time of day associated with a maximum number of interactions by the user. In some embodiments, the social networking system 140 determines 320 the time interval when the user most frequently interacts with the social networking system 140 as a specified duration from the time of day associated with the maximum number of interactions or as the specified duration prior to the time of day associated with the maximum number of interactions by the user. In other embodiments, the social networking system 140 determines numbers of interactions by the user with the social networking system 140 associated with different time intervals (e.g., different hours of a day) during the specific duration from the maintained information describing interactions by the user with the social networking system 140 and selects a time interval associated with a maximum number of interactions by the user as the time interval when the user most frequently interacts with the social networking system 140. The social networking system 140 may determine 320 the time interval when the user most frequently interacts with the social networking system 140 based on specific interactions with the social networking system 140 by the user in some embodiments. For example, the social networking system 140 determines 320 the time interval when the user most frequently interacts with the social networking system 140 as a time interval associated with a maximum number of interactions during the specific duration where the user viewed content items from the social networking system 140 or where the user accessed the social networking system 140 via an application executing on a client device 110. The social networking system 140 stores the time interval when the user most frequently interacts with the social networking system 140 in association with the user. For example, the social networking system 140 includes the time interval when the user most frequently interacts with the social networking system 140 in a user profile associated with the user.

To allow the user to more easily identify content items from groups including the user, the social networking system 140 identifies 325 content items provided by users to groups including the user. In various embodiments, the social networking system 140 identifies 325 identifiers of content items associated with group identifiers associated with an identifier of the user. The social networking system 140 may determine whether the user has viewed content items provided to groups including the user based on the maintained information describing interactions by the user and identify 325 content items that the user has not viewed and that were provided to one or more groups including the user.

For each of the identified content items, the social networking system 140 determines 330 amounts of interaction an identified content items by social networking system users. In various embodiments, the social networking system 140 determines 330 an amount of interaction with an identified content item based on a number of specific types of interactions with the identified content item by social networking system users. For example, the social networking system 140 determines 330 an amount of interaction with an identified content item based on numbers of times users have indicated a preference for the identified content item, shared the identified content item with other users, and commented on the identified content item. However, in other embodiments, the social networking system 140 determines 330 an amount of interaction with an identified content item based on numbers of occurrences of any suitable interactions with the identified content item. In various embodiments, the social networking system 140 determines 330 a score for each identified content item representing amount of interaction with each identified content item. The score for an identified content item is based on the numbers of specific interactions with the identified content item. For example, a score for the identified content item is a sum of a number of interactions with the identified content item where users indicated a preference for the identified content item, a number of interactions with the identified content item where users shared the identified content item with another user, and a number of interactions with the identified content item where users commented on the identified content item. In some embodiments, the social networking system 140 associates different weights with different interactions and applies a weight associated with an interaction to a number of the interaction with the identified content item. For example, a larger weight is associated with commenting on the identified content item than is associated with indicating a preference for the identified content item. Additionally, the social networking system 140 may associate higher weights with interactions performed by additional users connected to the user via the social networking system 140 in some embodiments, so interactions with the identified content item by additional users connected to the user have a greater influence on the score for the identified content item. The social networking system 140 determines 330 the score for the identified content item by combining the numbers of different specific interactions after application of the weights. Additionally, the social networking system 140 may account for an amount of time since the identified content item was received by the social networking system 140 when determining 330 the score for the identified content item. For example, the social networking system 140 applies a decay factor to a combination of numbers of specific interactions with the identified content item that decreases as the time since the social networking system received the identified content item increases. In various embodiments, the decay factor is inversely related (e.g., inversely proportional) to the amount of time since the social networking system received 310 the candidate content item 140. Additionally, the social networking system 140 may account for types of content in an identified content item when determining 330 the score for the identified content item. For example, the social networking system 140 increases scores for identified content items including video data or image data relative to identified content items including text data and not including video data or image data.

To identify content items provided to one or more groups including the user with which the user is likely to interact, the social networking system 140 selects 335 a set of identified content items having at least a threshold amount of interaction by users. In various embodiments, the social networking system 140 ranks the identified content items based on their scores and selects 335 the set as identified content items having at least a threshold position in the ranking. Alternatively, the social networking system 140 selects 335 the set as identified content items having at least a threshold score. If the social networking system 140 accounts for amounts of time since identified content items, the social networking system 140 may be more likely to include more recently received identified content items in the set.

The social networking system 140 presents 340 information identifying the set of identified content items to the user at a time within the determined time interval when the user most frequently interacts with the social networking system 140. By presenting 340 information identifying the set of identified content items at the time within the time interval when the user most frequently interacts with the social networking system 140, the likelihood of the user viewing or interacting with the information identifying the set of identified content items is increased, which may also increase interaction between the user and one or more groups including the user. For example, presenting 340 information identifying the set of identified content items at the time within the determined time interval when the user most frequently interacts with the social networking system 140 increases a likelihood of the user interacting with one or more of the identified content items in the set. In some embodiments, if the determined time interval specifies a time of day, and if a current time is after the determined time interval, the social networking system 140 presents 340 the notification to the user during the determined time interval on a subsequent day; hence, the notification is presented 340 to the user during the determined time interval when the user most frequently interacts with the social networking system 140 to maximize a likelihood of the user interacting with the notification. The social networking system 140 may present 340 any suitable information identifying the set of identified content items to the user. For example, the social networking system 140 communicates a notification describing the set of the identified content items to one or more client devices 110 associated with the user at the time within the determined time interval when the user most frequently interacts with the social networking system 140. The notification may include social context identifying one or more additional users connected to the user via the social networking system who interacted with a selected content item, an identifier of a group including the selected content with which the additional users interacted, and a portion of the selected content item; for example, the notification identifies names of one or more additional users connected to the user who interacted with a selected content item, a name of a group including the selected content item, and a portion of the content of the selected content item. The online system 140 may select additional users connected to the user to identify in the notification based on the user's affinity for additional users who interacted with a selected content item, so the notification identifies additional users for whom the user has at least a threshold affinity or for whom the user has highest affinities relative to other additional users connected to the user who interacted with the content item. In various embodiments, the notification identifies a number of content items in the set and is presented in a specific portion of an application executing on a client device 110 presenting content from the social networking system 140 to the user. However, any suitable communication channel (e.g., email, text message, etc.) may be used to present 340 the information identifying the set of identified content items to the user.

In some embodiments, the social networking system 140 modifies a frequency with which the user receives information identifying content items provided to groups including the user based on the user's interaction with previously presented information identifying content items provided to groups including the user. For example, the social networking system 140 increases the frequency with which notifications identifying content items provided to groups including the user are presented 340 to the user if the user accesses or selects notifications identifying content items provided to groups including the user at greater than a threshold frequency. Similarly, the social networking system 140 decreases the frequency with which notifications identifying content items provided to groups including the user are presented 340 to the user if the user accesses or selects notifications identifying content items provided to groups including the user at less than an additional threshold frequency. This allows the social networking system 140 to regulate presentation of information identifying content provided to groups including the user based on prior interactions by the user interacting with information identifying content items provided to groups including the user. Accounting for prior interactions with information identifying content provided to groups including the user allows the social networking system 140 to provide information identifying content provided to groups including the user at a frequency that increases the likelihood of the user interacting with the provided information

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

storing information in a social networking system describing one or more groups, each group including one or more users of the social networking system;

receiving content items provided by users to one or more of the groups;

maintaining information at the social networking system describing interactions with the social networking system by a user, the information identifying times when the user performed one or more interactions with the social networking system;

determining a time period when the user most frequently interacts with the social networking system based on the maintained information identifying times when the user performed one or more interactions with the social networking system;

identifying content items provided by users to one or more groups that include the user;

determining amounts of interaction by users of the social networking system with the identified content items;

selecting a set of the identified content items having at least a threshold amount of interaction by users of the social networking system;

presenting information identifying the set of the identified content items to the user at a time within the determined time period;

increasing a frequency with which information identifying additional content items provided to the one or more groups including the user is presented to the user during a time interval following the determined time period, if the user interacted with the presented information at greater than a threshold frequency; and decreasing the frequency with which the information identifying additional content items provided to the one or more groups including the user is presented to the user during the time interval following the determined time period, if the user interacted with the presented information at less than an additional threshold frequency.

2. The method of claim 1, wherein determining amounts of interaction by users of the social networking system with the identified content items comprises:
determining scores for each identified content item, the score for each identified content item based at least in part on a number of one or more specific interactions with the identified content item by users of the social networking system.

3. The method of claim 2, wherein the one or more specific interactions with the identified content item are selected from a group consisting of: indicating a preference for the identified content item, commenting on the identified content item, sharing the identified content item with another user of the social networking system, and any combination thereof.

4. The method of claim 2, wherein determining scores for each identified content item comprises:
associating a weight with each of the one or more specific interactions with each identified content item by users of the social networking system; and
determining scores for each identified content item based at least in part on the weights associated with each of the one or more specific interactions.

5. The method of claim 4, wherein the score for each identified content item is further based on a time since the identified content item was provided to the social networking system.

6. The method of claim 2, wherein the score for each identified content item is further based on a type of content included in the identified content item.

7. The method of claim 6, wherein the type of content included in the identified content item is selected from a group consisting of: text data, image data, video data, audio data, and any combination thereof.

8. The method of claim 2, further comprising:
ranking the identified content items based at least in part on their scores; and
selecting the set of the identified content items based at least in part on the ranking.

9. The method of claim 8, wherein selecting the set of the identified content items based at least in part on the ranking comprises:
selecting the set of the identified content items as content items having at least a threshold position in the ranking.

10. The method of claim 2, wherein selecting the set of the identified content items having at least the threshold amount of interaction by users of the social networking system comprises:
selecting the set of the identified content items as identified content items having at least a threshold score.

11. The method of claim 1, wherein presenting information identifying the set of the identified content items to the user at the time within the determined time period comprises:
communicating a notification to one or more client devices associated with the user at the time within the determined time period.

12. A computer program product comprising a computer readable storage medium having instructions encoded thereon that, when executed by a processor, cause the processor to:
store information in a social networking system describing one or more groups, each group including one or more users of the social networking system;
receive content items provided by users to one or more of the groups;
maintain information at the social networking system describing interactions with the social networking system by a user, the information identifying times when the user performed one or more interactions with the social networking system;
determine a time period when the user most frequently interacts with the social networking system based on the maintained information identifying times when the user performed one or more interactions with the social networking system;
identify content items provided by users to one or more groups that include the user;
determine amounts of interaction by users of the social networking system with the identified content items;
select a set of the identified content items having at least a threshold amount of interaction by users of the social networking system;
present information identifying the set of the identified content items to the user at a time within the determined time period;
increase a frequency with which information identifying additional content items provided to the one or more groups including the user is presented to the user during a time interval following the determined time period, if the user interacted with the presented information at greater than a threshold frequency; and
decrease the frequency with which the information identifying additional content items provided to the one or more groups including the user is presented to the user during the time interval following the determined time period, if the user interacted with the presented information at less than an additional threshold frequency.

13. The computer program product of claim 12, wherein the instructions further cause the processor to:
determine scores for each identified content item, the score for each identified content item based at least in part on a number of one or more specific interactions with the identified content item by users of the online system.

14. The computer program product of claim 13, wherein the one or more specific interactions with the identified content item are selected from a group consisting of: indicating a preference for the identified content item, commenting on the identified content item, sharing the identified content item with another user of the online system, and any combination thereof.

15. The computer program product of claim 13, wherein the instructions further cause the processor to:
associate a weight with each of the one or more specific interactions with each identified content item by users of the online system; and
determine scores for each identified content item based at least in part on the weights associated with each of the one or more specific interactions.

16. The computer program product of claim 15, wherein the score for each identified content item is further based on a time since the identified content item was provided to the social networking system.

17. The computer program product of claim 13, wherein the instructions further cause the processor to:
- rank the identified content items based at least in part on their scores; and
- select the set of the identified content items based at least in part on the ranking.

18. The computer program product of claim 17, wherein the instructions further cause the processor to:
- select the set of the identified content items as content items having at least a threshold position in the ranking.

19. The computer program product of claim 12, wherein the instructions further cause the processor to:
- communicate a notification to one or more client devices associated with the user at the time within the determined time period.

* * * * *